A. C. ISRAEL.
Nut-Lock.
No. 206,793. Patented Aug. 6, 1878.
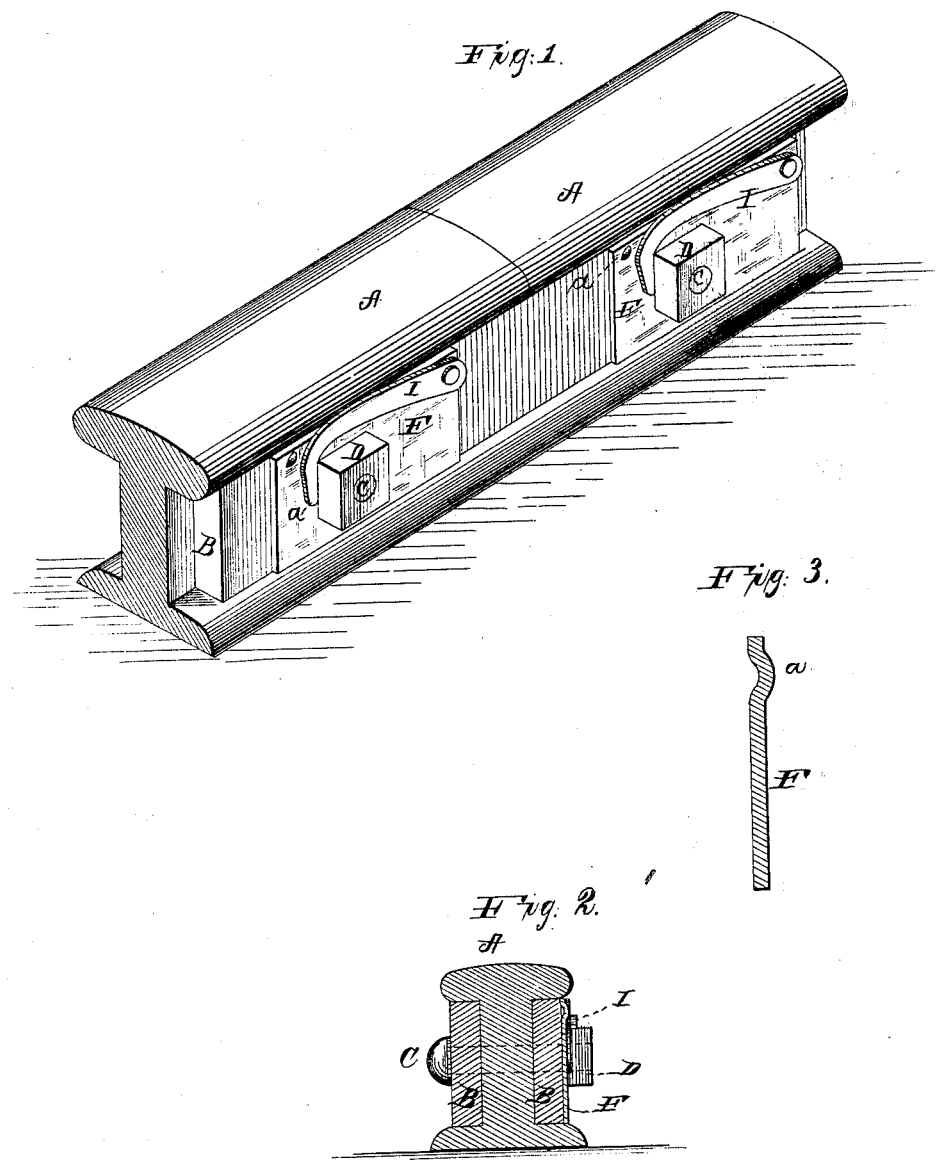
WITNESSES
INVENTOR
Alexander C. Israel
By Alexander Mason
Attorneys

UNITED STATES PATENT OFFICE.

ALEXANDER C. ISRAEL, OF KIMMSWICK, MISSOURI.

IMPROVEMENT IN NUT-LOCKS.

Specification forming part of Letters Patent No. 206,793, dated August 6, 1878; application filed April 15, 1878.

*To all whom it may concern:*

Be it known that I, ALEXANDER C. ISRAEL, of Kimmswick, in the county of Jefferson, and in the State of Missouri, have invented certain new and useful Improvements in Railroad Nut-Locks; and do hereby declare that the following is a full, clear, and exact description thereof, reference being had to the accompanying drawings, and to the letters of reference marked thereon, making a part of this specification.

The nature of my invention consists in the construction and arrangement of a nut-locking device which has for its object to prevent nuts on bolts from becoming loose by a succession of jars, such as all bolts and nuts used in bolting together railroad-rails are subjected to.

My invention is particularly adapted for railroad use, but may be used to advantage in factories, saw-mills, machine-shops, and various other places.

In order to enable others skilled in the art to which my invention appertains to make and use the same, I will now proceed to describe its construction and operation, referring to the annexed drawing, in which—

Figure 1 is a perspective view of a rail-joint embodying my invention. Fig. 2 is a transverse vertical section of the same. Fig. 3 is a cross-section of a plate or washer used.

A A represent the adjoining ends of two railroad-rails. B B are the fish-bars; C C, the bolts, and D D the nuts.

On the end of each bolt C next to the fish-bar B is placed a plate or washer, F, of such size as to fit between the top and foot of the rail, and thus be prevented from turning. To the face of this plate F is pivoted a hook, I, in such a manner that when the nut is screwed up tight the hook can be pressed down over the nut to prevent it from unscrewing and becoming loose.

The plate F is formed with a nipple or lug, $a$, struck up from the plate, by means of which the hook is prevented from rising above the nut by any ordinary jar; but whenever the bolt becomes loose by wear or shrinkage the nut can be tightened without removing or raising the hook by hand, as the hook will allow the nut to be turned in the direction to tighten it, but not the other way.

The lug or nipple $a$ is not absolutely necessary, as the weight of the hook has a tendency to keep it down, and if it should rise to the top of the rail the passing trains would not allow it to rise any higher.

I do not claim a nut-lock having a thin curved arm pivoted above the nut and an angular base-block at its lower end adapted to embrace a lower corner of the nut, and having a branch to fit between the lower face of the nut and the upper surface of the flange of the rail, as I am aware that such is not new.

Having thus fully described my invention, what I claim as new, and desire to secure by Letters Patent, is—

The combination, with the plate F, provided with the lug $a$, of the hook I, pivoted to the plate, as shown, and the bolt and nut, whereby the nut is held from unscrewing, but can be tightened on the bolt without raising the hook by hand, as set forth.

In testimony that I claim the foregoing I have hereunto set my hand this 30th day of March, 1878.

ALEXANDER C. ISRAEL.

Witnesses:
E. PECKHAM,
C. H. DALLAS.